(12) United States Patent
Park et al.

(10) Patent No.: US 6,839,497 B2
(45) Date of Patent: Jan. 4, 2005

(54) OPTICAL WAVEGUIDE PLATFORM AND METHOD OF MANUFACTURING THE SAME

(75) Inventors: Sang Ho Park, Daejon-Shi (KR); Jang Uk Shin, Daejon-Shi (KR); Yoon Jung Park, Seoul (KR); Duk Jun Kim, Daejon-Shi (KR); Young Tak Han, Daejon-Shi (KR); Hee Keyng Sung, Daejon-Shi (KR)

(73) Assignee: Electronics and Telecommunications Research Institute, Daejon (KR)

( * ) Notice: Subject to any disclaimer, the term of this patent is extended or adjusted under 35 U.S.C. 154(b) by 85 days.

(21) Appl. No.: 10/330,119

(22) Filed: Dec. 30, 2002

(65) Prior Publication Data

US 2004/0028312 A1 Feb. 12, 2004

(30) Foreign Application Priority Data

Aug. 8, 2002 (KR) ................................ 10-2002-0046732

(51) Int. Cl.⁷ ................................................ G02B 6/10
(52) U.S. Cl. ........................................................ 385/129
(58) Field of Search ........................... 385/129, 14, 65, 385/126, 130, 131

(56) References Cited

U.S. PATENT DOCUMENTS

| | | | | |
|---|---|---|---|---|
| 5,805,627 A | * | 9/1998 | Kubota et al. ................. | 372/46 |
| 6,164,836 A | | 12/2000 | Yamada et al. | |
| 6,208,791 B1 | * | 3/2001 | Bischel et al. ............... | 385/129 |
| 6,393,171 B2 | * | 5/2002 | Sasaki et al. ................... | 385/14 |
| 6,606,442 B2 | * | 8/2003 | Korenaga et al. ........... | 385/129 |
| 6,608,946 B2 | * | 8/2003 | Kikuchi et al. ................ | 385/14 |
| 6,631,235 B1 | * | 10/2003 | Kawashima et al. ......... | 385/129 |
| 2004/0057646 A1 | * | 3/2004 | Berry et al. ................... | 385/12 |

FOREIGN PATENT DOCUMENTS

KR  2000-67245  11/2000

OTHER PUBLICATIONS

Toshikazu Hashimoto, et al.; *Multichip Optical Hybrid Integration Technique with Planar Lightwave Circuit Platform*; Journal of Lightwave Technology, vol. 16, No. 7, Jul. 1998; pp. 1249–1258.

Kuniharu Kato, et al.; *PLC Hybird Integration Technology and Its Application to Photonic Components*; IEEE Journal of Selected Topics in Quantum Electronics, vol. 6, No. 1; Jan./Feb. 2000; pp. 4–13.

Shinji Mino, et al.; *A 10 Gb/s Hybrid–Integrated Receiver Array Module Using a Planar Lightwave Circuit (PLC) Platform Including a Novel Assembly Region Structure*; Journal of Lightwave Technology, vol. 14, No. 11; Nov. 96; pp. 2475–2482.

* cited by examiner

Primary Examiner—Karl D. Frech
Assistant Examiner—Edwyn Labaze
(74) Attorney, Agent, or Firm—Piper Rudnick LLP

(57) ABSTRACT

An optical waveguide platform and a method of manufacturing the same are disclosed. The optical waveguide platform comprises an optical waveguide having a lower clad layer, a patterned core layer and an upper clad layer which are laminated on one area of said substrate sequentially, a terrace formed by patterning said lower clad layer, on the other area of said substrate, a metal and a solder formed on said terrace and an optical device mounted on said terrace containing said metal and said solder. According to the present invention, the optical waveguide platform can be manufactured in a simple method without damaging the optical waveguide and the manufacturing cost thereof can be reduced.

8 Claims, 3 Drawing Sheets

OPTICAL WAVEGUIDE PLATFORM AND METHOD OF MANUFACTURING THE SAME

BACKGROUND OF THE INVENTION

1. Field of the Invention

The present invention relates to a planar optical waveguide type optical module and a method of manufacturing the same, more particularly, to an optical waveguide platform capable of mounting an optical device by a flip-chip bonding and a method of manufacturing the same.

2. Description of the Prior Art

Recent technologies require the development of highly functional opto-electronic components. Opto-electronic hybrid integration using a silica planar lightwave circuit (PLC) is one promising method to satisfy the requirement. The combination of the PLC and active device leads to ahighly functional opto-electronic module for signal processing.

In manufacturing optical device on silicon substrate using a flame hydrolysis deposition and PE-CVD (plasma enhanced chemical vapor deposition), optical passive device such as optical waveguide can be fabricated, but active device such as a laser diode (LD) or a photo diode (PD) can not be integrated with ease.

A hybrid integration platform is an integrated opto-electronic circuit board, which includes an optical active device mounting plane and optical waveguide and electrical wiring. The hybrid integration platform can satisfy both the optical passive device function and the optical active function, for highly functional signal processing such as optical switching, optical signal transmission and so on.

In this case, the optical connection loss must be sufficiently small by mounting and aligning a small-sized optical active device precisely with the optical waveguide. Accordingly, an optical waveguide platform capable of mounting the optical active device using flip-chip bonding was reported.

Hereinafter, a first conventional method of manufacturing the optical waveguide platform will be explained with reference to FIGS. 1A to 1D.

Referring to FIG. 1A, a given area of a silicon substrate 101 is anisotropically etched to form a terrace 102. A lower clad layer (silica layer) 103 is formed on the terrace 102. The lower clad layer 103 has unevenness in the surface due to the step of the terrace 102.

Referring to FIG. 1B, in order to remove the surface unevenness of the lower clad layer 103 due to the step of the terrace 102, the lower clad layer 103 is polished and it's surface is planarized. A core layer is formed on the lower clad layer 103 and patterned to form core waveguide 104 and then an upper clad layer 105 is formed to cover the planarized lower clad layer 103 and the core waveguide 104.

Referring to FIGS. 1C and 1D, a predetermined area of the upper clad layer 105, the core waveguide 104 and the flattened lower clad layer 103 are dry-etched so that the terrace 102 is exposed to mount an optical device therein. Numeral number 106 represent a trench in which the optical device is mounted. An insulating film 107 is formed in the trench 106 and metal layers 108 are formed on the insulating film 107 in the trench 106 to make an electrode and an UBM (Under Bump Metal) pad.

Next, solder is deposited on the UBM pad which is composed of the metal film 108 and an optical device 109 is mounted on it. The optical device 109 is generally a semi-conductor chip such as a LD or a PD. A metal wire 110 is interconnected electrically between the backside of the optical device 109 and the metal electrode 108.

In the above-mentioned conventional method of manufacturing the optical waveguide platform, a silicon etching process is required in order to make the terrace. Because of the unevenness generated in the lower clad layer due to the step of the terrace, the polishing process is required to planarize the lower clad layer. In the process of precisely etching the silicon to form the terrace, a separate photolithography process using a mask is needed. Furthermore, a terrace pattern can not be manufactured accurately if crystallized direction of the silicon wafer is wrong. Also, in polishing the lower clad layer of the optical waveguide, since the silica film of the lower clad layer has a thickness of several tens $\mu$m, it is difficult to polish the lower clad layer precisely. And, if the deviation in the polished thickness exists, the lower clad layer can be partly lost so that it affects the characteristics of the optical waveguide. In particular, in case of a general silica optical waveguide, the substrate could be bent. The bending of the substrate is caused by the difference between the thermal expansive coefficients of the silica film and the silicon substrate. Because of this bending of substrate, a precise polishing without the deviation of the thickness can not be accomplished. Accordingly, there is a problem that a separate process such as a heating treatment is needed for preventing the substrate from being bent.

Hereinafter, a second conventional method of manufacturing the optical waveguide platform will be explained with reference to FIGS. 2A to 2D.

Referring to FIG. 2A, a lower clad layer 202 and a core layer 203 are sequentially formed on a silicon substrate 201 and the core layer is patterned to form core waveguide. A trench area is dry-etched to a needed depth in which optical devices can be mounted.

Referring to FIG. 2B, etch stopper 204 is deposited and patterned on the etched area. An upper clad layer 205 is formed on the lower clad layer 202, the core layer 203 and the etch stopper 204.

Referring to FIG. 2C, the upper clad layer 205 in the trench area is etched so that etch stopper 204 is exposed. A metal and solder 206, in order to mount the optical active device and supply the power to drive the device, is on a given area of the etch stopper 204 in the trench area.

Referring to FIG. 2D, an optical device 207 is mounted on the metal and solder 206 with a flip-chip bonding method.

In the above-mentioned conventional method, after the core layer is etched, the etch stopper must be formed. During the processes, the fine optical waveguide pattern having a thickness of several $\mu$m is apt to be damaged by the mechanical impact such as a mask contact. Furthermore, in a subsequent high-temperature process of forming the upper clad layer, since the etch stopper is basically composed of a material different from the silica, it is difficult to form an accurate terrace pattern due to the pattern variation or the crack of the etch stopper. The characteristics of the optical device can be affected by the possible deformation of the core layer and the change of the refractive index, which are caused by the oxidation or the corrosion of the etch stopper.

SUMMARY OF THE INVENTION

Thus, the object of the present invention is to provide an optical waveguide platform that can be manufactured in a simple process without the etching or polishing process of the silicon and without any thickness adjusting layer, capable of operating in a high speed, and to provide optical waveguide for hybrid integration, and a method of manufacturing the same.

The other object of the present invention is to provide an optical waveguide platform that can be manufactured in a simple method by simultaneously performing the process of forming terrace and etching process of trench area using a general lithography process without the damage of the optical waveguide.

According to the present invention an optical waveguide platform is characterized, it comprises a substrate, an optical waveguide having a lower clad layer, a patterned core and an upper clad layer which are laminated on one area of said substrate sequentially, a terrace formed by patterning said lower clad layer, on the other area of said substrate, a metal and a solder formed on said terrace, and an optical device mounted on said terrace containing said metal and said solder.

Also, a method of manufacturing an optical waveguide platform according to the present invention comprises the step of forming an optical waveguide, by laminating a lower clad layer, a patterned core layer to form waveguide, and an upper clad layer on a substrate; forming a first mask layer on given area of said upper clad layer and etching the said upper clad layer, said core layer, and part of said lower clad in the other area in order to form a trench; forming a second mask layer on said lower clad layer exposed in said trench and etching said lower clad layer with a predetermined depth using said second mask in order to form a terrace; forming a metal film for a solder pad and a wire on said terrace after removing said first and second masks; and forming and melting to mount a solder on the said metal film for said solder pad, mounting an optical device thereon.

The sidewall of said optical waveguide exposed to the wall of said trench may have an optical mirror surface.

The metal film may formed by sequentially forming Ti/Pt/Au or Ti/Ni/Au metal films by a thermal deposition or electron beam deposition. The solder may be formed with an alloy of InPb, PbSn, or AuSn.

Preferably, the central axis of said optical device is aligned with the central axis of said optical waveguide upon mounting said optical device, the alignment in the vertical direction is performed by controlling the etched depth of said trench, and the alignment in the horizontal direction is performed by matching the alignment key formed when etching the terrace with the alignment key formed on the optical device.

The trench may be etched by a dry etching method such as an Inductively Coupled Plasma (ICP) method or a Reaction Ion Etching (RIE) method.

The terrace may be manufactured by depositing a chrome thin film in the trench, patterning it by a lift-off method, forming a mask pattern for etching the terrace, and dry-etching the trench.

The metal and the solder may be formed by a thermal depositing method or an electron beam depositing method and patterning it with a lift-off method.

The optical waveguide platform according to the present invention can be manufactured in a simple method without anisotrophic etching step of the silicon substrate. In addition, the optical waveguide platform according to the present invention can solve the problem that a fine waveguide pattern is damaged, since the trench and the terrace are formed after the waveguide is manufactured. Also, in the optical waveguide platform according to the present invention, the property of the optical waveguide can be previously monitored before etching the trench.

BRIEF DESCRIPTION OF THE ATTACHED DRAWINGS

DESCRIPTION OF THE PREPERRED EMBODIMENT

Figure 1A:
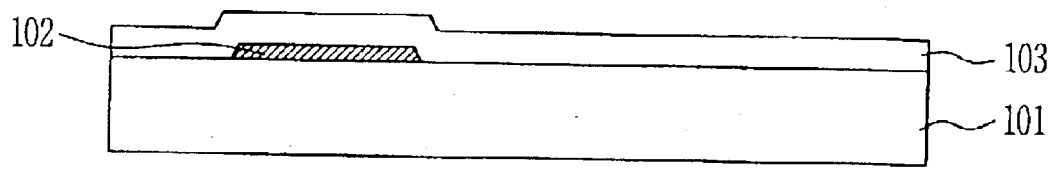
FIGS. 1A to 1D are cross-sectional views illustrating a first conventional method of manufacturing an optical waveguide platform in the process sequence.
Figure 1B:
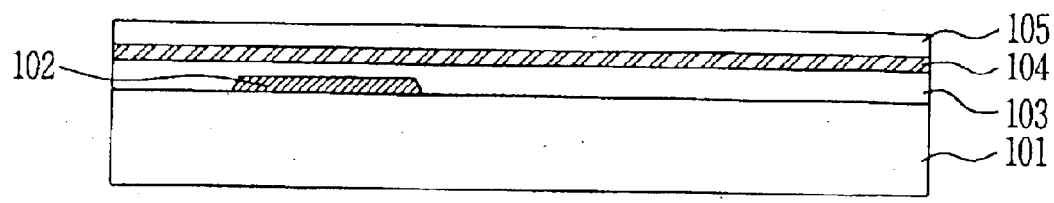
Figure 1C:
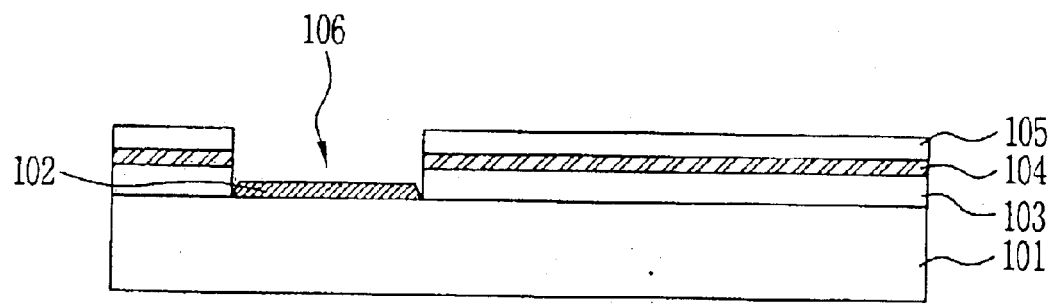
Figure 1D:
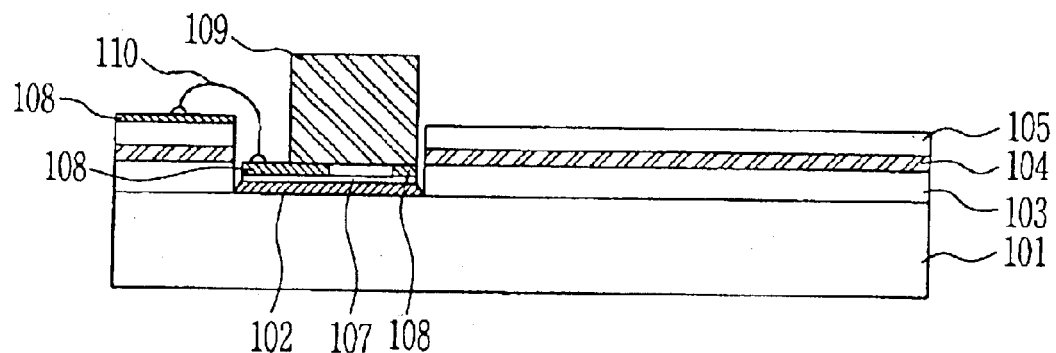
Figure 2A:
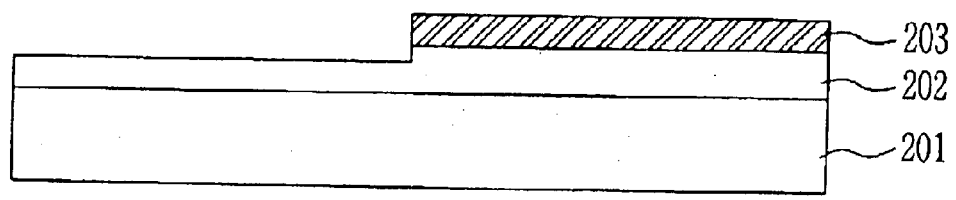
FIGS. 2A to 2D are cross-sectional views illustrating a second conventional method of manufacturing an optical waveguide platform in the process sequence.
Figure 2B:
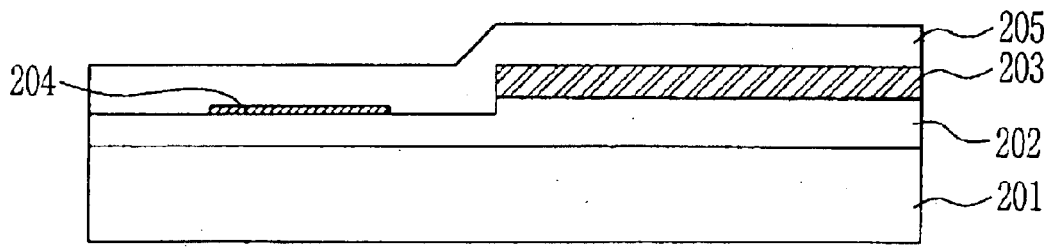
Figure 2C:
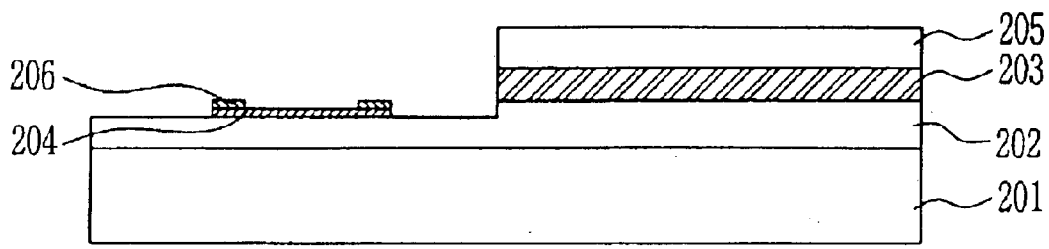
Figure 2D:
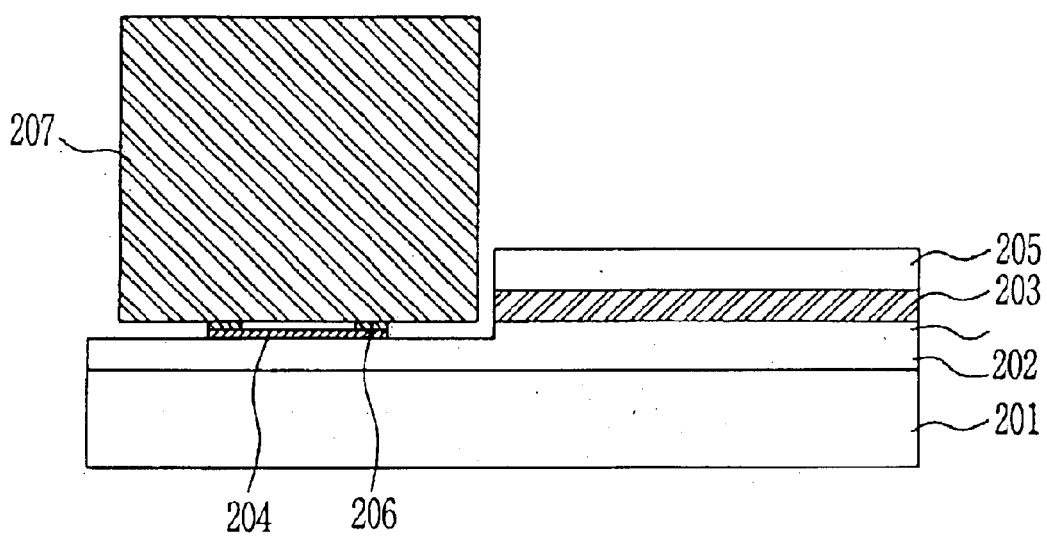

Hereinafter, the embodiments of the present invention will be explained with reference to the accompanying drawings. However, the embodiment of the present invention can be changed into a various type, and it should not be understood that the scope of the present invention is limit to the following embodiments. The embodiments of the present invention are provided in order to explain the present invention to those skilled in the art. Also, in drawings, a same reference numeral indicates a same element.

FIGS. 3A to 3E are cross-sectional views illustrating a method of manufacturing an optical waveguide platform according to the present invention in the process sequence.

Figure 3A:
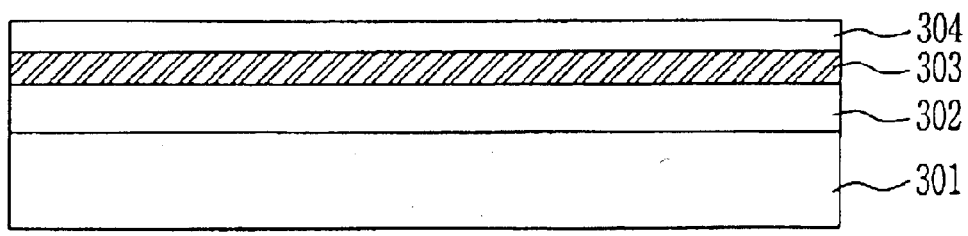
FIGS. 3A to 3E are cross-sectional views illustrating a method of manufacturing an optical waveguide platform according to the present invention in the process sequence.

Referring to FIG. 3A, a lower clad layer 302 is formed and a core layer 303 is stacked on a substrate 301 sequentially. The core layer 303 forms an optical waveguide core by patterning and etching processes. And, an upper clad layer 304 is formed on the core layer 303. The optical waveguide consists of the lower clad layer 302, the patterned core waveguide 303 and an upper clad layer 304, as known in the art.

The substrate 301 may be a silicon substrate. The lower clad layer 302 is formed using flame hydrolysis deposition, the PE-CVD method or the like. The lower clad layer 302, the core layer 303 and the upper clad layer 304 have a respectively adjusted refractive index to function as an optical waveguide. Unlike the prior art, the above-described processes do not affect the characteristics of the optical waveguide. In addition, the present invention can monitor the optical properties in this step, whereas optical properties of the optical device can not be measured in the conventional method. It is because the platforms of the conventional method do not have waveguides formed on the terrace region in the trench. In the present invention, since the waveguide can be formed in the area where the trench and the terrace will be formed, the properties of the optical waveguide can be measured. For these reasons, the quality of the optical waveguide can be previously measured before etching the trench.

Figure 3B:
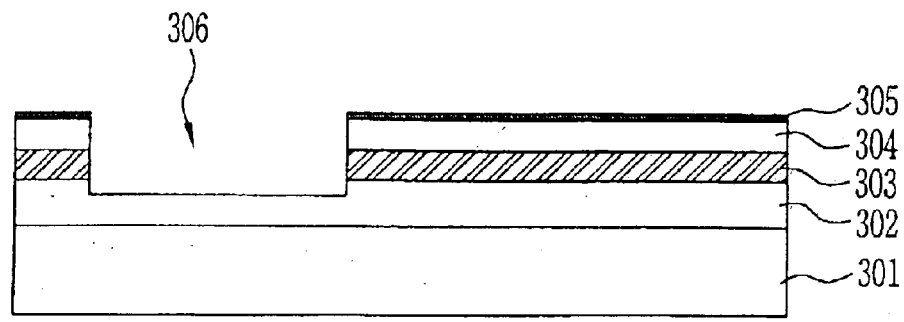

Referring to FIG. 3B, a metal mask layer 305 such as chrome is formed on the upper clad layer 304 using the photolithography process. The metal mask layer 305 is patterned in order to define the trench region within which the optical device is mounted. The upper clad layer 304, the core layer 303 and the lower clad layer 302 are etched out to form the trench. The core 303 (the optical waveguide core) is exposed in the side wall of the trench, and the exposed core 303 is aligned with the optical axis of the optical device such as LD or a PD. A dry etching process such as an Inductively Coupled Plasma (ICP) etching or a Reactive Ion etching (RIE) may be used in etching the trench. The etched depth of the trench must be precisely controlled so that the waveguide center of the optical device can be precisely aligned with the center of the waveguide core in a vertical direction. The depth of the central axis of the optical device can be adjusted depending on the etched depth of the trench after the optical waveguide is manufactured. It is impossible to adjust the depth of the central axis of the optical device in the prior art. In other words, in the prior art, the depth of the central axis of the optical device cannot be adjusted after the optical waveguide is manufactured. Therefore, all kinds of optical devices can be mounted in the present invention. The etched sidewall of the optical waveguide forms an optical mirror surface.

Figure 3C:
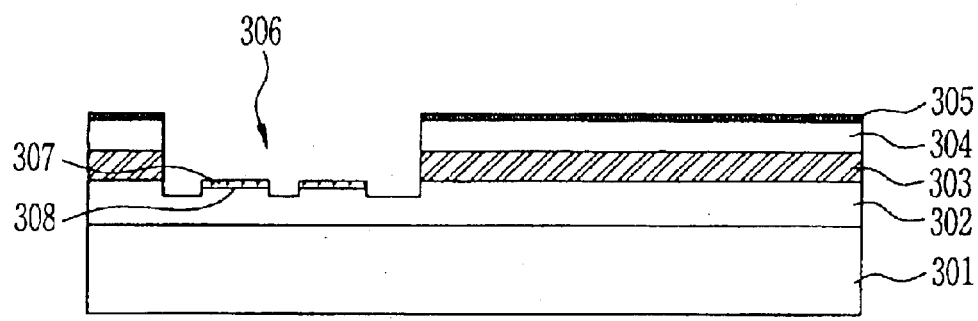

Referring to FIG. 3C, after a mask layer 307 is formed on a given area of the bottom surface of the trench 306 by a lithography process, the lower clad layer 302 is etched with a predetermined depth by dry etching method. Through this processes, a terrace 308 is formed. Upon etching the terrace 308, an align key for aligning the optical device is simultaneously formed. The etching process is performed while remaining the mask 305 used in forming the trench 306. The terrace is formed partially.

Figure 3D:
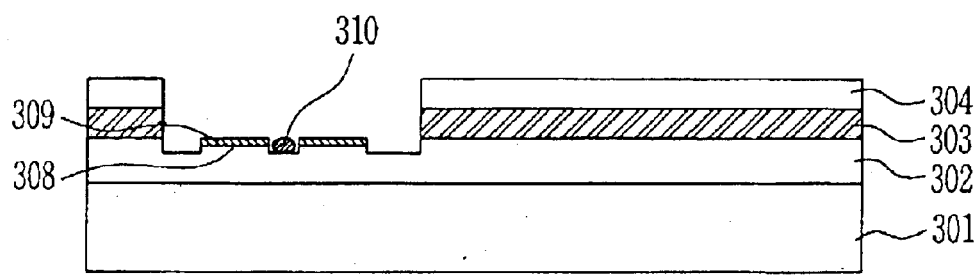

Referring to FIG. 3D, after the mask layers 305 and 307 are removed, an UBM metal film 309 for solder pad or a wire is formed on the floor of the terrace 308. The metal film 309 is a conductor, which is strongly adhered to the floor of the terrace 308. The driving current of the optical device flows through the metal film 309. The metal film 309 can be manufactured by sequentially forming Ti/Pt/Au or Ti/Ni/Au metal films with a thermal deposition or an electron beam deposition method and patterning them by a lift-off method or the like. Hereinafter, a solder 310 is formed on the solder pad. The solder 310 may an alloy of InPb, PbSn, or AuSn.

Figure 3E:
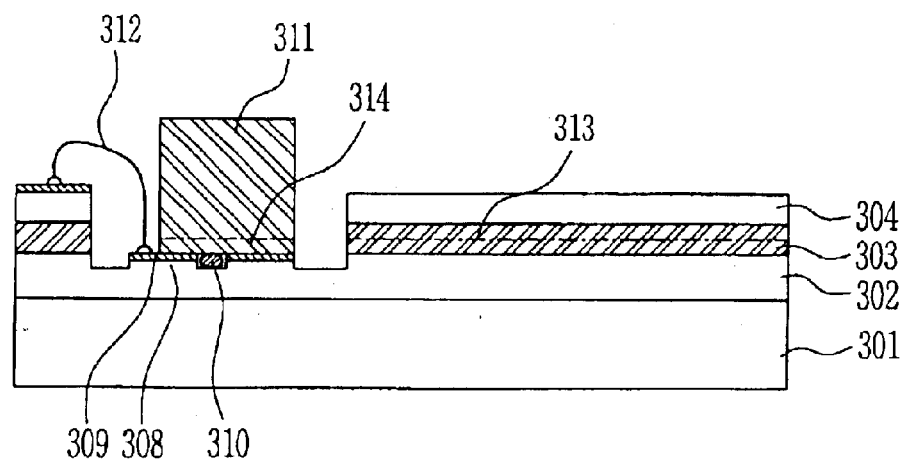

Referring to FIG. 3E, the solder 310 is melted at the temperature below 400° C. The optical device 311 such as LD or PD is mounted thereon and is interconnected to the outer electrode by using a metal wire 312. In this case, upon mounting the optical device 311, the central axis 313 of the optical waveguide must be precisely aligned with the central axis 314 of the optical device. The alignment in the vertical direction can be performed by controlling the etched depth when forming (etching) the trench, and the alignment in the horizontal direction can be precisely performed by matching the align key formed when etching the terrace 308 with the alignment key formed on the optical device 311.

In the present method of manufacturing the optical waveguide platform, the terrace required for mounting the optical device is formed after the waveguide manufacturing processes. In addition, without the step of processing the silicon substrate which was needed in the prior art, the optical waveguide platform capable of mounting a semiconductor chip can be manufactured. Therefore, a problem of limiting the used of crystal direction of the silicon substrate due to the anisotropic etching can be solved. Unlike the conventional method that needs the polishing process for removing the unevenness of the lower clad layer of the optical waveguide generated by the step of the terrace, the present invention does not need the thickness adjusting layer for adjusting the height of the optical device and the optical waveguide. And even the process of polishing the lower clad layer of the optical waveguide is not necessary, since the terrace is formed during the trench etching process. In addition, the terrace forming process is performed after the optical waveguide process is finished, thereby the change of the characteristics of the optical device due to the damage of the fine pattern of the optical waveguide generated in forming the etch stop film after etching the optical waveguide and forming the upper clad layer can be prevented. Particularly, unlike the prior art, the characteristics of the optical waveguide can be measured and the quality of the optical waveguide can be previously determined before etching the trench. Accordingly, the optical waveguide platform according to the present invention can be manufactured in a simple method without damaging the optical waveguide and the manufacturing cost thereof can be reduced.

What is claimed is:

1. An optical waveguide platform, comprising:
   a substrate;
   an optical waveguide having a lower clad layer, a patterned core layer and an upper clad layer which are laminated on said substrate, wherein a trench is formed by selectively removing said upper clad layer, said core layer and a portion of said lower layer;
   a terrace and an align key formed in the trench by patterning said lower clad layer;
   a metal and a solder formed on said terrace; and
   an optical device mounted on said terrace containing said metal and said solder, an optical axis of said optical device being aligned with said core layer exposed in a sidewall of said trench.

2. A method of manufacturing an optical waveguide platform, comprising the step of:
   forming an optical waveguide, by laminating a lower clad layer, a core layer and a upper clad layer on a substrate, said core layer being patterned in order to form an optical waveguide core;
   forming a first mask layer on given area of said upper clad layer and etching the other area of said upper clad layer, said core layer, and said lower clad layer in order to form a trench;
   forming a second mask layer on said lower clad layer in said trench and etching the other area of said lower clad layer with a predetermined depth using said second mask in order to form a terrace;
   forming a metal film for a solder pad and a wire on the floor of said terrace after removing said first and second masks; and
   forming a solder on the said metal film for said solder pad, mounting an optical device thereon.

3. The method of manufacturing an optical waveguide platform according to claim 2, wherein said upper clad layer, said core layer, and said lower clad layer are formed with a silica film having respectively adjusted refractive indexes.

4. The method of manufacturing an optical waveguide platform according to claim 2, wherein during said trench is formed through a dry etching process, the etch depth thereof is adjusted so that the output of said optical device is aligned with the center of the core of said optical waveguide in a vertical direction.

5. The method of manufacturing an optical waveguide platform according to claim 2, wherein the side wall of said optical waveguide exposed through said trench forms an optical mirror surface.

6. The method of manufacturing an optical waveguide platform according to claim 2, wherein said metal film is formed by sequentially forming Ti/Pt/Au or Ti/Ni/Au metal films by a thermal deposition or an electron beam deposition.

7. The method of manufacturing an optical waveguide platform according to claim 2, wherein said solder is formed with an alloy of InPb, PbSn, or AuSn.

8. The method of manufacturing an optical waveguide platform according to claim 2, wherein the central axis of said optical device is aligned with the central axis of said optical waveguide upon mounting said optical device, the alignment in the vertical direction is performed by controlling the etched depth of said trench, and an alignment in a horizontal direction is performed by matching the alignment key formed when etching the terrace with the alignment key formed on the optical device.

* * * * *